United States Patent
Mrowca

(10) Patent No.: US 10,304,256 B2
(45) Date of Patent: May 28, 2019

(54) POINT CLOUD CLEANING METHOD

(71) Applicant: INDOOR REALITY INC., Berkeley, CA (US)

(72) Inventor: Damian Mrowca, Stanford, CA (US)

(73) Assignee: INDOOR REALITY INC., Berkeley, CA (US)

( * ) Notice: Subject to any disclaimer, the term of this patent is extended or adjusted under 35 U.S.C. 154(b) by 145 days.

(21) Appl. No.: 15/376,793

(22) Filed: Dec. 13, 2016

(65) Prior Publication Data

US 2018/0165871 A1    Jun. 14, 2018

(51) Int. Cl.
    *G06T 19/20* (2011.01)

(52) U.S. Cl.
    CPC ...... *G06T 19/20* (2013.01); *G06T 2219/2021* (2013.01)

(58) Field of Classification Search
    None
    See application file for complete search history.

(56) References Cited

U.S. PATENT DOCUMENTS

| | | | |
|---|---|---|---|
| 9,251,399 B2* | 2/2016 | Hwang | G06K 9/00201 |
| 9,684,817 B2* | 6/2017 | Huang | G06K 9/00214 |
| 2003/0074174 A1* | 4/2003 | Fu | G05B 19/4099 703/13 |
| 2005/0135670 A1* | 6/2005 | Vaidyanathan | G06T 17/10 382/154 |
| 2006/0061566 A1* | 3/2006 | Verma | G06T 17/00 345/419 |
| 2010/0280649 A1* | 11/2010 | Chen | B23Q 17/0947 700/175 |
| 2013/0022241 A1* | 1/2013 | Goodman | G01S 17/87 382/103 |
| 2013/0051658 A1* | 2/2013 | Hwang | G06K 9/00201 382/154 |
| 2016/0071318 A1* | 3/2016 | Lee | G06T 17/00 345/419 |
| 2016/0125226 A1* | 5/2016 | Huang | G06K 9/00201 382/154 |
| 2017/0140631 A1* | 5/2017 | Pietrocola | G08B 21/0476 |
| 2017/0337665 A1* | 11/2017 | Chaouch | G06T 5/002 |

FOREIGN PATENT DOCUMENTS

WO    WO 2016079179 A1 *  5/2016  ............. G06T 5/002

* cited by examiner

*Primary Examiner* — Bernard Krasnic
(74) *Attorney, Agent, or Firm* — Kali-Law Group, P.C.

(57) ABSTRACT

Methods for cleaning a point cloud using an electronic computing device are presented, the method including: causing the electronic computing device to decompose the point cloud into a number of cell voxels; removing a number of outlier cell voxels; subsampling the point cloud; removing a first number of outlier points; removing a number of double surfaces; and removing a second number of outlier points. In some embodiments, method further include outputting a clean point cloud to file. In some embodiments, the causing the electronic computing device to decompose the point cloud further includes: reading into memory a number of points corresponding with the point cloud; specifying a cell voxel size; creating a cell grid to chunk the point cloud into a number of smaller sets; sorting the number of points into the number of cell voxels; and merging all point clouds.

10 Claims, 5 Drawing Sheets

POINT CLOUD CLEANING METHOD

BACKGROUND

Mobile scanning of buildings has become the standard for capturing a 3D scan of an indoor environment. Mobile scanners typically employ various sensor arrays in order to capture the whole environment. In some examples, multiple lasers may be each be oriented in different directions that overlap sufficiently to provide a full coverage or near full coverage scan. These scans generate millions of points along a path traversed by a user. These millions of points are collectively known as a point cloud.

Several issues may arise with respect to mobile scans. For example, a mobile user may not travel at precisely a given speed. As such, scans may be alternately more or less dense due to speed variations. In another example, noise from reflective surfaces or from electronic interference may resulting in false or inaccurate points in the point cloud. Further, ghosting may occur that generates false surfaces in the point cloud. Each of these issues individually or collectively may result in an inaccurate representation of the environment. Complicating these issues is that the sheer volume of points being processed in the point cloud may lead to processing inefficiencies due to limitations in computing power.

As such, methods for point cloud cleaning are provided herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for cleaning a point cloud using an electronic computing device are presented, the method including: causing the electronic computing device to decompose the point cloud into a number of cell voxels; removing a number of outlier cell voxels; subsampling the point cloud; removing a first number of outlier points; removing a number of double surfaces; and removing a second number of outlier points. In some embodiments, method further include outputting a clean point cloud to file. In some embodiments, the causing the electronic computing device to decompose the point cloud further includes: reading into memory a number of points corresponding with the point cloud; specifying a cell voxel size; creating a cell grid to chunk the point cloud into a number of smaller sets; sorting the number of points into the number of cell voxels; and merging all point clouds corresponding with all lasers utilized producing the point cloud into the cell grid; and caching the point cloud. In some embodiments, the removing the number of outlier cell voxels further includes: initializing a connected components grid; recursively reading directly neighboring cell voxels; and deleting all cell voxels not directly connected with the connected components grid. In some embodiments, the removing the first number of outlier points further includes: reading in a floor plan corresponding with the point cloud, where the floor plan is defined by a set of triangles; determining all outer boundaries of the floor plan; expanding the set of triangles to create a bloated floor plan; and removing the first number of outlier points that lie outside the bloated floor plan. In some embodiments, removing a number of double surfaces further includes: estimating normals for each point of the cell grid; removing any double surfaces along normals; comparing normals of detected points with normals of original points; keeping only detected points whose normals deviate less than a normal angle threshold from the normals of original points; dividing remaining points into two groups based on group timestamp; determining density of the two groups; and removing one of the two groups of lower density. In some embodiments, methods further include repeating the removing the number of double surfaces along all normals of the point cloud.

In other embodiments, computing device program products for cleaning a point cloud using a computing device are presented, the computing device program product including: a non-transitory computer readable medium; first programmatic instructions for causing the electronic computing device to decompose the point cloud into a number of cell voxels; second programmatic instructions for removing a number of outlier cell voxels; third programmatic instructions for subsampling the point cloud; fourth programmatic instructions for removing a first number of outlier points; fifth programmatic instructions for removing a number of double surfaces; and sixth programmatic instructions for removing a second number of outlier points, where the programmatic instructions are stored on the non-transitory computer readable medium.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Figure 1:
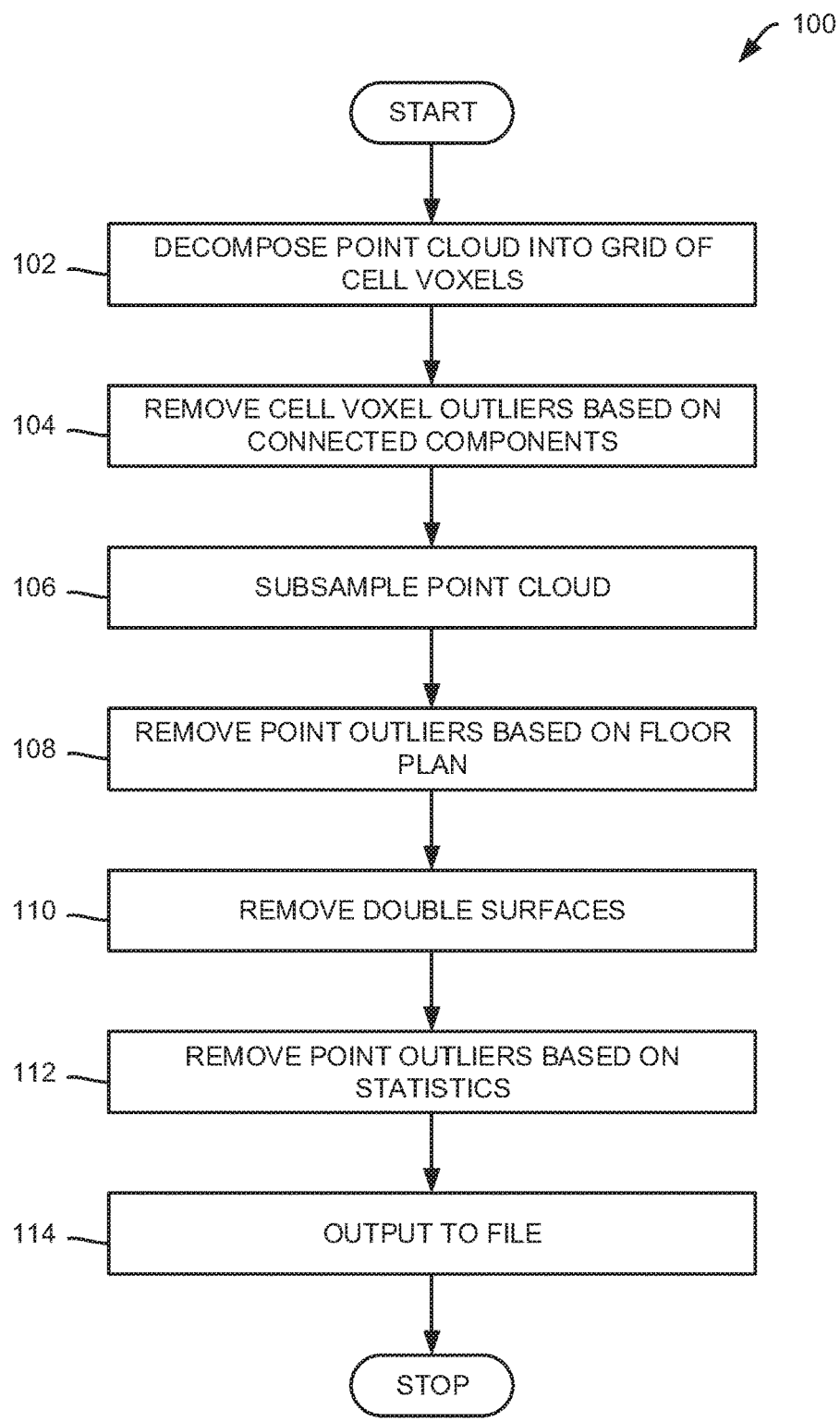
FIG. 1 is an illustrative flowchart of a method for cleaning a point cloud in accordance with embodiments of the present invention.

FIG. 1 is an illustrative flowchart 100 of a method for cleaning a point cloud in accordance with embodiments of the present invention. As illustrated, at a first step 102, the method decomposes a point cloud into a grid of cell voxels (i.e. cell grid). When a building is scanned, a resulting point cloud may contain many millions of points from any of several detection devices. Decomposing a point cloud creates a regular 3D grid of cell voxels filled with points from the point cloud. By decomposing the point cloud, processing may proceed more efficiently since cell voxels may be processed individually or in smaller groups to limit the number of points being processed at once. Decomposing the point cloud will be discussed in further detail below for FIG. 2. At a next step 104, the method removes cell voxel outliers of a point cloud based on connected components. Removing outliers based on connected components operates on a grid cell basis. As such, removal of outliers proceeds on a cell by cell basis as opposed to a point by point bases disclosed below. Removing outliers based on connected components will be discussed in further detail below for FIG. 3.

At a next step 106, the method subsamples the point cloud. In methods utilized herein subsampling may be applied to one cell at a time to more efficiently and effectively manage memory resources. In embodiments, a subsampling resolution may be user selected where a higher resolution will result in a more detailed and dense point cloud and a lower resolution will result in a less detailed and dense point cloud. Methods of subsampling are well-known in the art and any subsampling method may be utilized without departing from embodiments provided herein. It may be appreciated that subsampling may be useful to accommodate non-regular scanning speed to regularize the density of the point cloud. For example, when traveling at a slow pace, a scan may be much more dense (i.e. more points scanned per unit time) than when the scan is made at a high pace. At a next step 108, methods remove outliers of a point cloud based on a building floor plan corresponding with the point cloud. By removing outliers based on a floor plan, methods are particularly useful in cleaning up areas along walls represented in the floor plan. Removing outliers may proceed, in embodiments, on a cell by cell basis. Removing outliers based on floor plans will be discussed in further detail below for FIG. 4.

At a next step 110, the method removes double surfaces. Double surfaces may occur as artifacts during a scan of a building. Typically, double surfaces have different densities. That characteristic may be exploited to remove an unwanted double surface. Removing double surfaces will be discussed in further detail below for FIG. 5. At a next step 112, the method removes point outliers based on statistics. In embodiments, this step is only applied to a set of grid cells at the same time for efficient memory usage. The size of this set may be determined by the processing set size. The grid cell set may be padded by at least one cell at its boundaries to avoid wrongly removing point from the grid cell set boundaries. The padding cells are not altered during the processing of the corresponding set but at another iteration when they become part of the set themselves. At a next step 114, the method outputs the results (i.e. a clean point cloud) to file. The file includes a merges, subsampled, and filtered point cloud suitable for further processing. Any number of file formats may be utilized without departing from embodiments presented herein including, but not limited to .txt, .xyz, .pcd, .obj, .pts, .las, and .laz. The method then ends.

Figure 2:
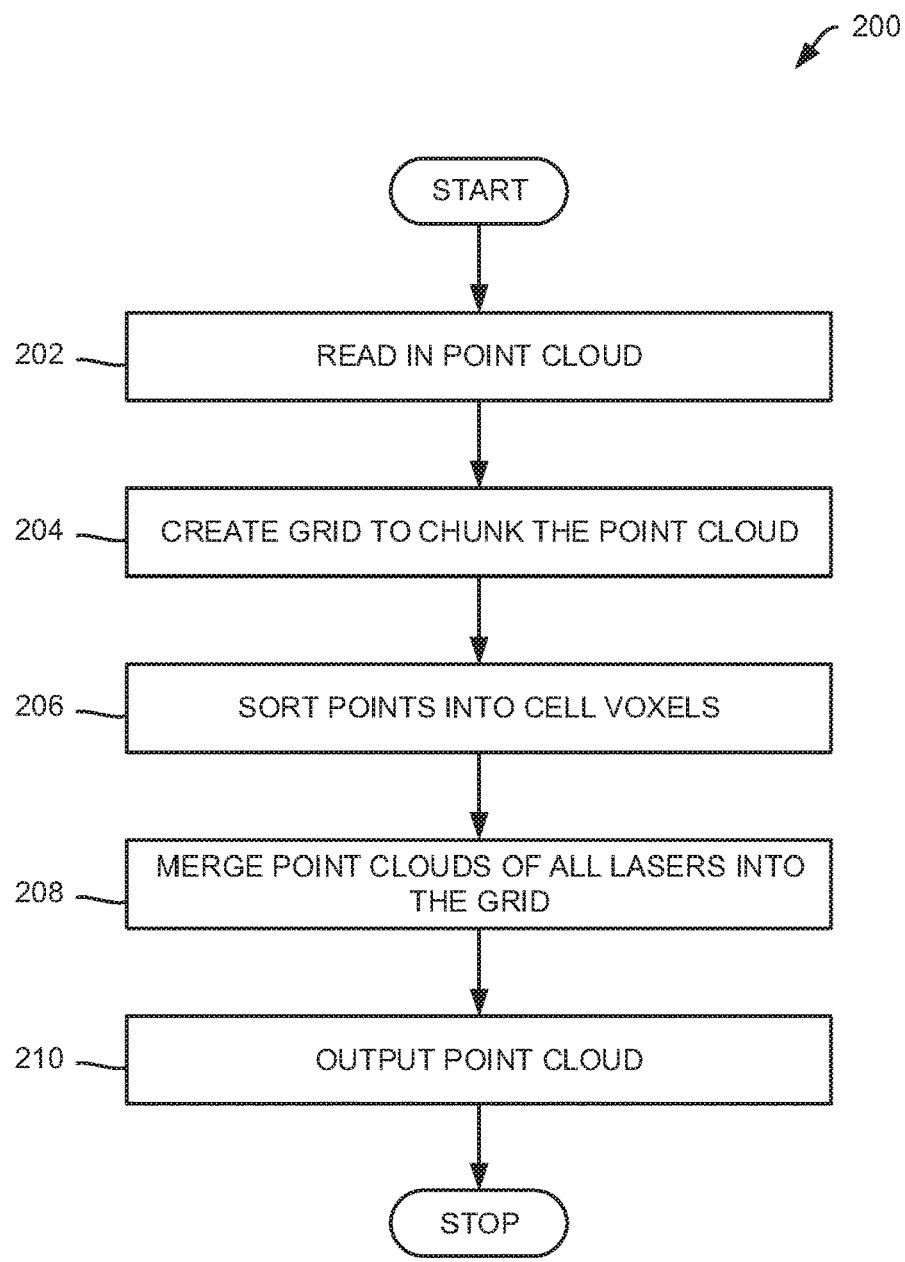
FIG. 2 is an illustrative flowchart of a method for decomposing a point cloud in accordance with embodiments of the present invention.

FIG. 2 is an illustrative flowchart 200 of a method for decomposing a point cloud in accordance with embodiments of the present invention. In particular, flowchart 200 further illustrates a step 102 (FIG. 1). At a first step 202, the method reads in a point cloud point by point from point cloud files. At a next step 204, the methods creates a cell grid to chunk the point cloud. That is, using a cell voxel size specified by the user a cell grid is created to chunk the point cloud into smaller pieces or sets. In embodiments, the cell grid is initialized at the first pose of the path file. At a next step 206, the method sorts all points into cell voxels. As utilized herein a cell voxel is a cell in the cell grid containing a number of points from the point cloud. As such, based on their position in world coordinates, all points are sorted into the cell voxels. If a cell voxel already exists at the position of the point, the point is sorted into the existing cell voxel. If no cell voxel exists at the position of the point a new cell voxel is created. At a next step 208, the method merges all point clouds of all lasers into the cell grid. As may be appreciated, in building scans, several lasers may be utilized to produce a multi-dimensional point cloud. For example, lasers may collect data from any number of views such as: upward facing, downward facing, leftward facing, rightward facing, forward facing, and backward facing. Each of these views may produce a point cloud corresponding with a particular view—All of which may be merged to a single cell grid.

At a next step 210, the method outputs the merged point cloud that is subdivided into cells that are filled with point cloud points whereupon the method ends. This output may be cached on storage media to be further processed. As provided herein, all of the following steps read in a point cloud from a cached grid of cells. Accordingly all of the following steps write and overwrite their results into the cache. That means that after every step it is possible to write out the point cloud from the cache on the storage media.

Figure 3:
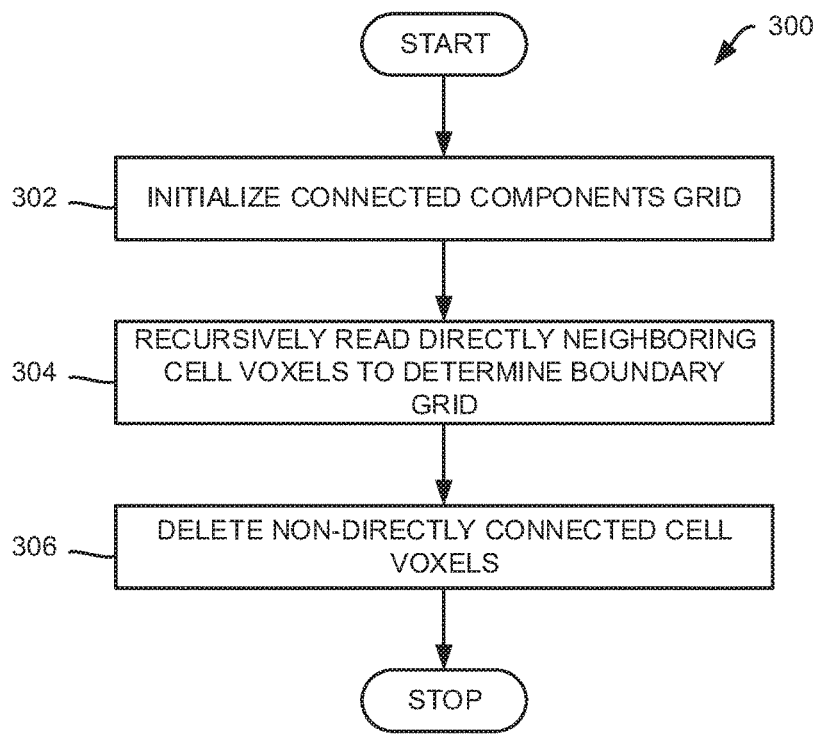
FIG. 3 is an illustrative flowchart of a method for removing outliers in accordance with embodiments of the present invention.
Figure 6:
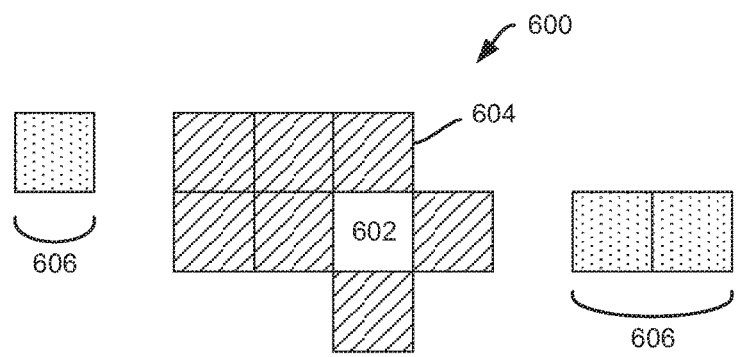
FIG. 6 is an illustrative representation of a connected components grid in accordance with embodiments of the present invention.

FIG. 3 is an illustrative flowchart 300 of a method for removing outliers in accordance with embodiments of the present invention. In particular, flowchart 300 further illustrates a step 104 (FIG. 1). Furthermore, reference will be made to FIG. 6, which is an illustrative representation of connected components grid 600 in accordance with embodiments of the present invention for flowchart 300. As such, at a first step 302, the method initializes a connected components grid with a cell at the location a first pose of the path file. Initial cell 602 is illustrated in FIG. 6. Returning to FIG. 3, at a next step 304, the method recursively reads directly neighboring cell voxels from cached cell grid for each connected cell voxel in each direction. Connected cell voxels 604 are illustrated in FIG. 6. Returning to FIG. 3, at a step 304, the method deletes all cell voxels not directly connected with connected components grid 600. Unconnected cell voxels 606 are illustrated in FIG. 6. In order for the above method to operate, methods may assume a continuous path and a continuous record of points along this path. One reason why methods remove outliers based on connected components before subsampling and the other steps is that connected components operate on a grid cell basis while the remaining steps operate on a point basis. That means that connected components needs only to loop through all the cells, whereas subsampling and the following steps have to loop through all the points at the point cloud. Thus, connected components may be performed first before all other steps to improve processing efficiency.

Figure 4:
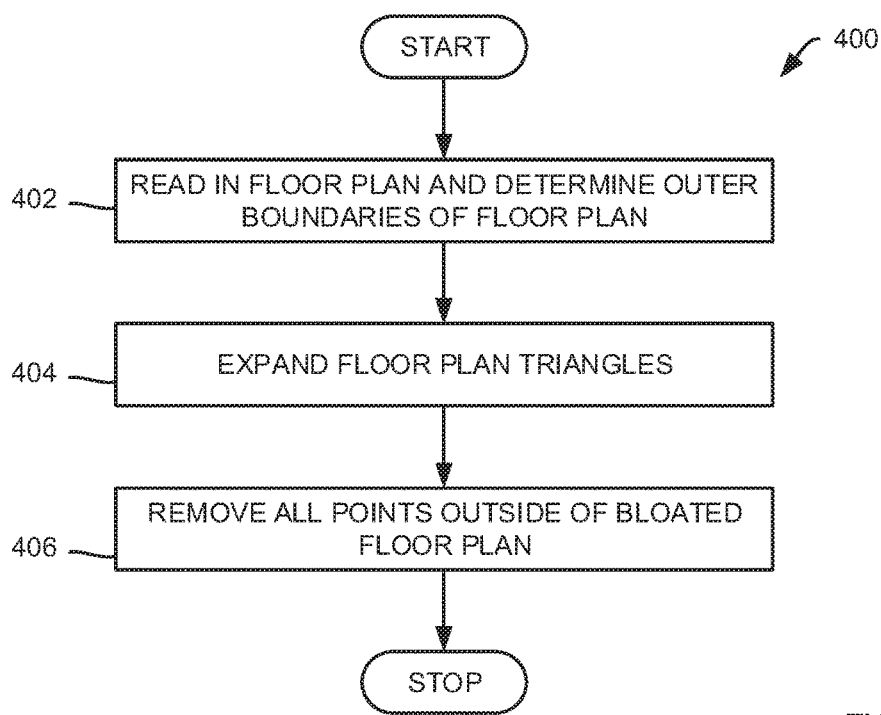
FIG. 4 is an illustrative flowchart of a method for removing outliers in accordance with embodiments of the present invention.
Figure 7:
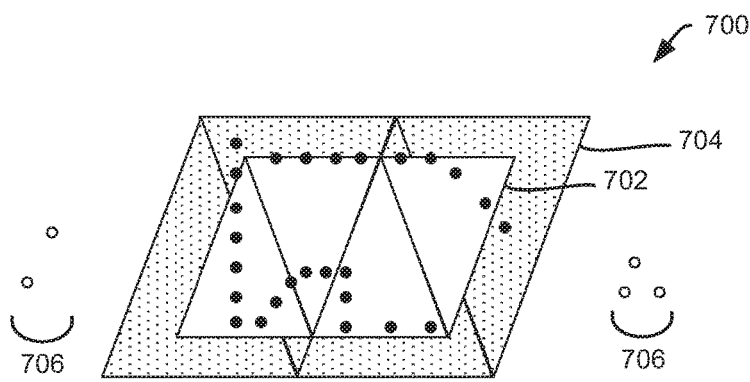
FIG. 7 is an illustrative representation of outlier removal based on floor plan 700 in accordance with embodiments of the present invention.

FIG. 4 is an illustrative flowchart 400 of a method for removing outliers in accordance with embodiments of the present invention. In particular, flowchart 400 further illustrates a step 108 (FIG. 1). Furthermore, reference will be made to FIG. 7, which is an illustrative representation of outlier removal based on floor plan 700 in accordance with embodiments of the present invention for flowchart 400. As such, at a first step 402, the method reads in a floor plan corresponding with the point cloud. In embodiments, the floor plan is defined by a set of triangles. In addition, the method, at a step 402 the method determines all outer boundaries of the floor plan. A portion of floor plan 702 is illustrated in FIG. 7. Returning to FIG. 4, at a next step 404, the method expands the set of triangles representing the floor plan to create a bloated floor plan. A bloated floor plan 704 is illustrated in FIG. 7. In embodiments the floor plan is bloated to a boundary tolerance specified by a user. The bloated floor plan generates a safety margin that prevents removal of points at the floor plan boundaries due to floor plan or alignment inaccuracies. Returning to FIG. 4, at a next step 406, the method removes all outlier points that lie outside the bloated floor plan. Outlier points 706 that lie outside bloated floor plan 704 are illustrated in FIG. 7. In this step, methods may process points on a cell by cell basis.

Figure 5:
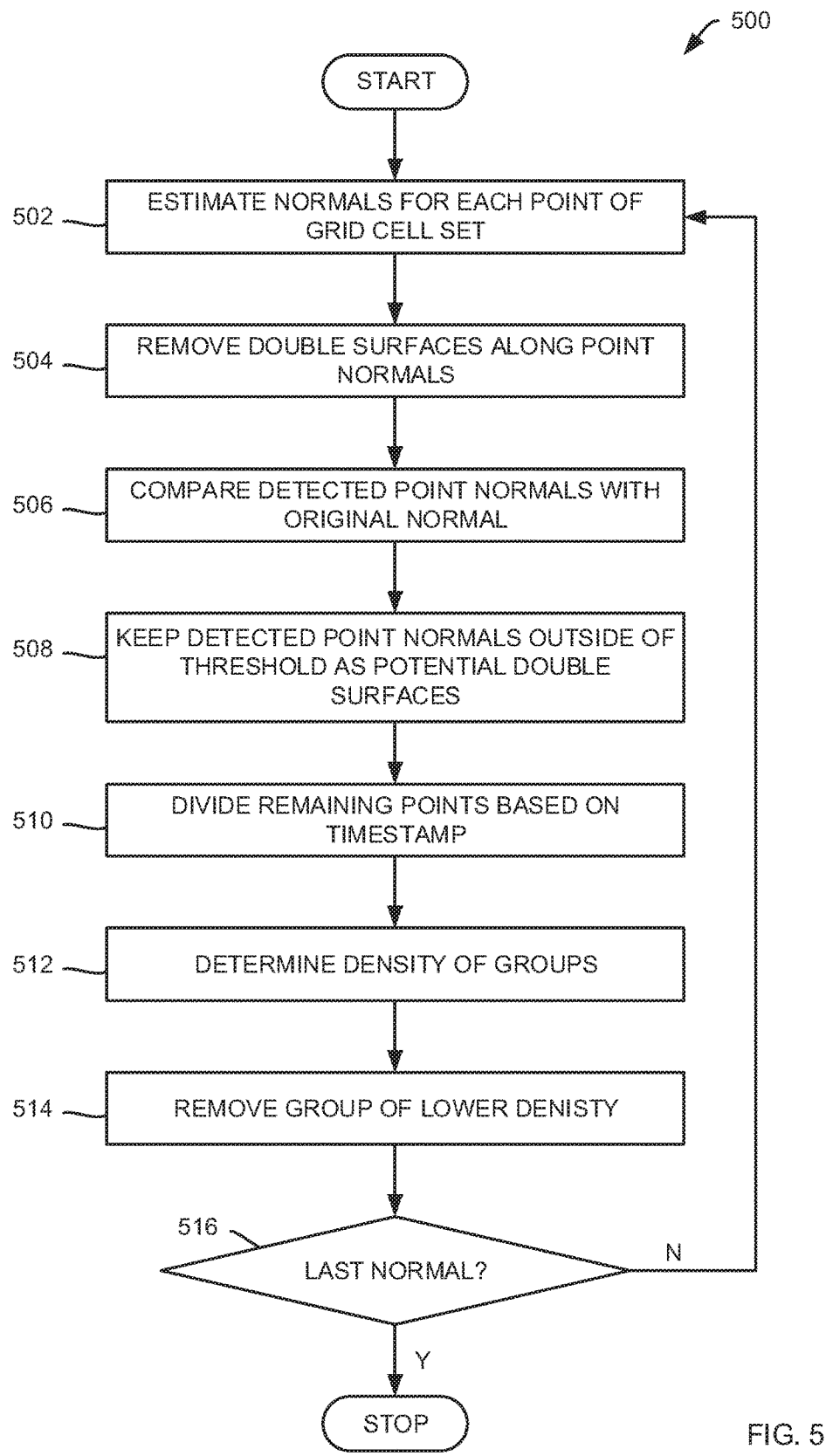
FIG. 5 is an illustrative flowchart of a method for removing double surfaces in accordance with embodiments of the present invention.
Figure 8:
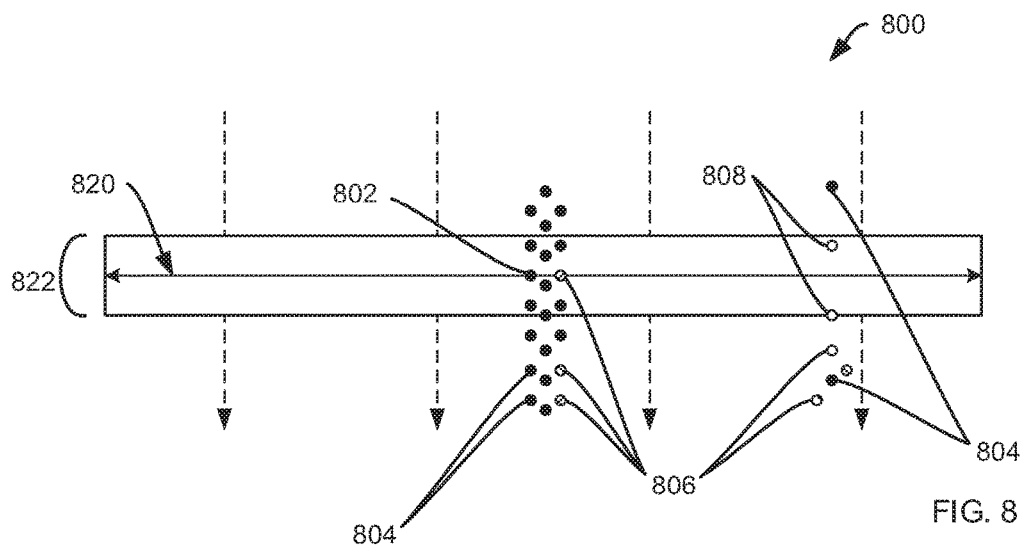
FIG. 8 is illustrative representation of double surface removal in accordance with embodiments of the present invention.

FIG. 5 is an illustrative flowchart 500 of a method for removing double surfaces in accordance with embodiments of the present invention. In particular, flowchart 500 further illustrates a step 110 (FIG. 1). Furthermore, reference will be made to FIG. 8, which is an illustrative representation of double surface removal 800 in accordance with embodiments of the present invention for flowchart 500. Methods process steps identified by flowchart 500 in sets of grid cells. Processing size may be specified by a user. Sets may be padded by border cells and points from border cells are not processed, but will be processed in another iteration when they are not located in border cells. As such, at a first step 502, the method estimates normals for each point of the cell grid. In embodiments, point normals may be flipped toward the viewpoint of each point from which it was recorded. An initial point 802 is illustrated in FIG. 8. As illustrated, normal 820 may be estimated that lies along initial point 802. Initial point 802 along with blackened points 804 are scanned at a different timestamps than hatched points 806. Furthermore, it may be seen that the density of the points on the left portion of the illustration is higher than the density of the points on the right portion of the illustration. Searching for points proceeds along a maximum distance perpendicular to the normal as illustrated by box 822.

Returning to FIG. 5, at a next step 504, the method removes double surfaces along the point normal up to a maximum distance from the point along the normal and up to a maximum distance perpendicular to the normal. Points for removal 808 along the normal in accordance with this step are illustrated in FIG. 8. Returning to FIG. 5, at a next step 506, the method compares detected point normals with the original normal. At a next step 508, the method keeps detected points whose normal deviates less than the normal angle threshold from the normal of the original point as potential double surface points that ought to be removed. At a next step 510, the methods devices remaining points based on timestamp—that is, points that lie within the time window threshold with respect to the original point and points that lie outside the time window. As noted above for FIG. 8, blackened points 804 are scanned at a different timestamps than hatched points 806. Returning to FIG. 5, at a next step 512, the method determines the density of both groups. The group with the smaller density will get removed. Therefore, similar to statistical outlier removal, the mean distance for each point to its neighbors is computed. Based on this mean distances the mean distance for each group is computed which indirectly correlates with the density of the groups— If the mean distance between points is high the density is low and vice versa. As such, at a next step 514, the method removes the group with lower density. In this manner, only points get removed that lie far outside of the denser group. Points, that actually lie within the denser group but have only a different timestamp are kept since they do not create a double surface but, on the contrary, support the denser area.

At a next step 516, the method determines whether a last normal has been reached. If the method determines at a step 516 that a last normal has not been reached, the method continues to a step 502 to repeat the method until all normals along each point in the point cloud has been searched. If the method determines at a step 516 that a last normal has been reached, the method ends.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A method for cleaning a point cloud using an electronic computing device, the method comprising:
   causing the electronic computing device to decompose the point cloud into a plurality of cell voxels, wherein
   the point cloud captured with a 3D mobile scan of an indoor environment, and wherein
   the causing the electronic computing device to decompose the point cloud further comprises:
      reading into memory a plurality of points corresponding with the point cloud;
      specifying a cell voxel size;
      creating a cell grid to chunk the point cloud into a plurality of smaller sets;
      sorting the plurality of points into the plurality of cell voxels; and
      merging all point clouds corresponding with all lasers utilized producing the point cloud into the cell grid; and
      caching the point cloud;
   removing a plurality of outlier cell voxels;
   subsampling the point cloud to accommodate a non-regular scanning speed corresponding with the 3D mobile scan and to regularize a density of the point cloud;
   removing a first plurality of outlier points to clean areas along a plurality of walls represented in a floor plan of the indoor environment;
   removing a plurality of double surfaces, wherein
      the removing a plurality of double surfaces further comprises:
         estimating normals for each point of the cell grid;
         removing any double surfaces along normals;
         comparing normals of detected points with normals of original points;
         keeping only detected points whose normals deviate less than a normal angle threshold from the normals of original points;
         dividing remaining points into two groups based on group timestamp;
         determining density of the two groups; and
         removing one of the two groups of lower density; and
   removing a second plurality of outlier points.

2. The method of claim 1, further comprising:
   outputting a clean point cloud to file.

3. The method of claim 1, wherein the removing the plurality of outlier cell voxels further comprises:
   initializing a connected components grid;
   recursively reading directly neighboring cell voxels; and
   deleting all cell voxels not directly connected with the connected components grid.

4. The method of claim 1, wherein the removing the first plurality of outlier points further comprises:
   reading in the floor plan corresponding with the point cloud, wherein the floor plan is defined by a set of triangles;
   determining all outer boundaries of the floor plan;
   expanding the set of triangles to create a bloated floor plan; and
   removing the first plurality of outlier points that lie outside the bloated floor plan.

5. The method of claim 1, further comprising;
   repeating the removing the plurality of double surfaces along all normals of the point cloud.

6. A computing device program product for cleaning a point cloud using an electronic computing device, the computing device program product comprising:
   a non-transitory computer readable medium;
   first programmatic instructions for causing the electronic computing device to decompose the point cloud into a plurality of cell voxels, wherein
      the first programmatic instructions for causing the electronic computing device to decompose the point cloud further comprises:
         reading into memory a plurality of points corresponding with the point cloud;
         specifying a cell voxel size;
         creating a cell grid to chunk the point cloud into a plurality of smaller sets;
         sorting the plurality of points into the plurality of cell voxels; and
         merging all point clouds corresponding with all lasers utilized producing the point cloud into the cell grid; and
         caching the point cloud;
   second programmatic instructions for removing a plurality of outlier cell voxels;
   third programmatic instructions for subsampling the point cloud;
   fourth programmatic instructions for removing a first plurality of outlier points;
   fifth programmatic instructions for removing a plurality of double surfaces, wherein
      the fifth programmatic instructions for removing a plurality of double surfaces further comprises:
         estimating normals for each point of the cell grid;
         removing any double surfaces along normals;
         comparing normals of detected points with normals of original points;
         keeping only detected points whose normals deviate less than a normal angle threshold from the normals of original points;
         dividing remaining points into two groups based on group timestamp;
         determining density of the two groups; and
         removing one of the two groups of lower density; and
   sixth programmatic instructions for removing a second plurality of outlier points, wherein the programmatic instructions are stored on the non-transitory computer readable medium.

7. The computing device program product of claim 6, further comprising:
   outputting a clean point cloud to file.

8. The computing device program product of claim 6, wherein the second programmatic instructions for removing the plurality of outlier cell voxels further comprises:
   initializing a connected components grid;
   recursively reading directly neighboring cell voxels; and
   deleting all cell voxels not directly connected with the connected components grid.

9. The computing device program product of claim 6, wherein the fourth programmatic instructions for removing the first plurality of outlier points further comprises:
   reading in a floor plan corresponding with the point cloud, wherein the floor plan is defined by a set of triangles;

determining all outer boundaries of the floor plan;

expanding the set of triangles to create a bloated floor plan; and removing the first plurality of outlier points that lie outside the bloated floor plan.

10. The computing device program product of claim 6, further comprising;

repeating the removing the plurality of double surfaces along all normals of the point cloud.

* * * * *